Nov. 15, 1966  H. W. SEELER  3,284,805
COMBINED CABIN UNIFORM AND MECHANICAL PARTIAL PRESSURE
SUIT COMPLETE WITH HELMET
Filed April 30, 1964  4 Sheets-Sheet 1

INVENTOR.
HENRY W. SEELER
BY
ATTORNEY

Nov. 15, 1966  H. W. SEELER  3,284,805
COMBINED CABIN UNIFORM AND MECHANICAL PARTIAL PRESSURE
SUIT COMPLETE WITH HELMET
Filed April 30, 1964  4 Sheets-Sheet 2

INVENTOR.
HENRY W. SEELER
BY
ATTORNEYS

INVENTOR.
HENRY W. SEELER
BY
ATTORNEYS

Nov. 15, 1966 H. W. SEELER 3,284,805
COMBINED CABIN UNIFORM AND MECHANICAL PARTIAL PRESSURE
SUIT COMPLETE WITH HELMET
Filed April 30, 1964 4 Sheets-Sheet 4

INVENTOR.
HENRY W. SEELER
BY
ATTORNEYS

United States Patent Office 3,284,805
Patented Nov. 15, 1966

3,284,805
COMBINED CABIN UNIFORM AND MECHANICAL PARTIAL PRESSURE SUIT COMPLETE WITH HELMET
Henry W. Seeler, Dayton, Ohio, assignor to the United States of America as represented by the Secretary of the Air Force
Filed Apr. 30, 1964, Ser. No. 364,045
7 Claims. (Cl. 2—2)

The invention described herein may be manufactured and used by or for the United States Government for governmental purposes without payment to me of any royalty thereon.

This invention relates to suits and garments for aviators and astronauts, having for an object the provision of a comfortable partial pressure suit which employs mechanical means for contracting the suit about the body of the wearer, in counter distinction to the present conventional pressurizing means for aviators' high altitude suits, such as inflatable capstans.

A further object of the invention is the provision of a mechanically pressurized partial pressure suit for aviators and astronauts in space vessels which includes fully automatic pressure responsive mechanical tensioning means for pressurizing the suit on the body of a wearer, responsive to a predetermined drop in the pressure exteriorly of the suit.

A still further object is the provision of a mechanically pressurized suit for astronauts, including a flexible oxygen supply helmet which is normally collapsed off the head of the astronaut when the suit is not pressurized and including means responsive to a predetermined reduction in the pressure surrounding the suit for automatically erecting the helmet around the head of the wearer and releasing the mechanical means for tightening the suit about the limbs and body of the wearer.

A further object of the invention is the provision of a mechanically pressurized suit for astronauts which can be comfortably worn, including a foldable pressure tight pop-up helmet connected thereto which is foldable back off the head of the astronaut in which the suit is mechanically automatically pressurized or tensioned about the limbs and body of the wearer in the event of decompression exteriorly of the suit, including pneumatic means to automatically erect the helmet about the head of the wearer to form an airtight oxygen supply helmet enclosure, designed as a comfortable compromise between a full pressure suit and the "shirt sleeve" idea.

A still further object includes a porous flexible suit having a flexible erectable helmet which is normally folded down around the neck of the wearer like a collar, and includes mechanical means for tensioning the suit about the body of the wearer to provide an improved partial pressure suit, including pressure means for automatically erecting the helmet around the head of the wearer, including pressure responsive means for actuating the mechanical means and the helmet erecting means upon a predetermined reduction in pressure exteriorly of the suit.

A further object of the invention is the provision of an astronaut's suit which is comfortably tailored, more like a uniform, and includes a plurality of substantially frictionless lacings extending along the limbs and body portion of the suit with mechanical pressure operated means for automatically tensioning the lacings upon a predetermined reduction of atmospheric or life sustaining pressure surrounding the exterior of the suit and wearer, whereby a satisfactory mechanical pressure suit is provided with the elimination of the conventional capstans and the oxygen or other fluid pressure mediums usually necessary for the pressurization of a conventional partial pressure suit about the body of the wearer and the removal of any possibility of leakage or loss of irreplaceable oxygen normally used for inflation of the capstans in conventional partial pressure suits.

A further object includes the provision of a form fitting mechanically automatically tensioned suit for astronauts, having a pneumatically erectable helmet or head closure, and the inclusion of form fitting automatically expandable pad members secured within the suit for fitting and filling out irregular depressions and hollows in the surfaces of the body and limbs of the wearer, comprising gas sealed sponge rubber like pad members in which the pads are expandable by the gas sealed therein upon a reduction in the outside or exterior pressure, to maintain sufficient pressure on the irregular or depressed portions and hollows in the surfaces of the limbs of the wearer when the suit is tensioned or contracted, to equalize the contracting pressure on the entire surface of the wearer's body.

A further object of the invention is the provision of a combined mechanical partial pressure suit and folded erectable helmet thereon in which the suit comprises a plurality of frictionless flexible lacings extending longitudinally along the sides of the legs, arms, and body portion of the suit for tightening the legs, arms, and body portion of the suit on a wearer when the lacings are pulled, and including releasable spring tensioning means connected to said lacings for pulling the same when released, together with means operable upon a predetermined reduction of pressure exteriorly of said suit for automatically releasing said spring means for pulling the lacings and simultaneously causing erection of the helmet to an exterior air excluding relation about the head of the wearer, including means for automatically introducing oxygen into the helmet to provide a life sustaining environment therein.

Like reference characters refer to like parts in the several figures of the drawings in which.

Figure 11:
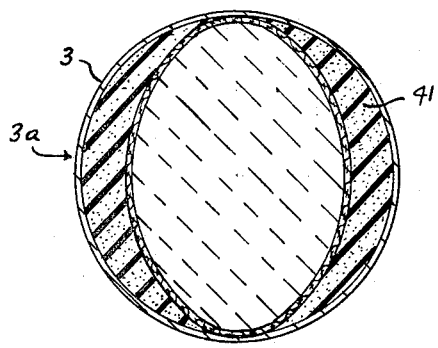
Figure 12:
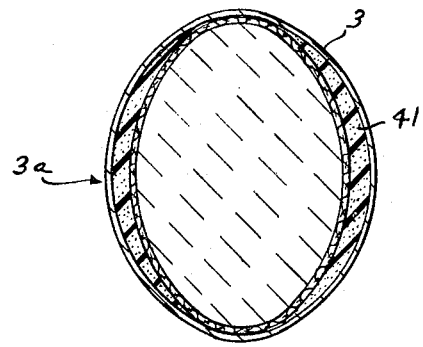

FIGS. 11 and 12 are somewhat diagrammatic cross-sectional views schematically illustrating the application of preformed gas filled or sealed form fitting pad-like units used between the interior of the suit, for instance in the limb portions and the exterior or surface of the wearer, such as gas filled cells of foam rubber like structure, arranged to expand in proportion to the reduction in the exterior surrounding pressure, for the purpose of filling out any uneven depressions in the outer surfaces of the wearer to maintain the confining mechanical pressure of the tensioning of the suit more uniform on the surface of the wearer's body. FIG. 11 shows one of the pads in its expanded condition due to reduction in the outside pressure, while FIG. 12 illustrates the pad in normal contracted relation, such as when the exterior atmospheric pressure is increased, for instance to normal.

In the drawings the reference numeral 1 denotes a mechanical partial pressure suit having arm portions 2, leg portions 3, a body portion 4, and a normally folded down pop-up helmet or head enclosure 5. The suit 1 is preferably made of flexible nonstretchable porous material or fabric, and is tailored to be comfortable and form fitting, having at least one longitudinal seam in each of the arm, leg, and body portions, as indicated at 2a, 3a and 4a.

Figure 3:
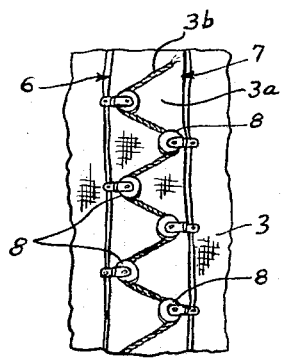
FIG. 3 is a fragmentary detail view of a portion of the suit illustrating one of the longitudinal seams with the alternately disposed almost frictionless cable pulleys on the opposite edges of the seam, and the tensioning cable in its relaxed or nontensioned condition.
Figure 4:
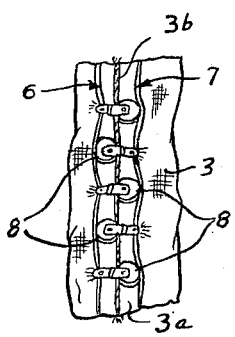
FIG. 4 is a similar detailed view illustrating the cable means pulled or tensioned to mechanically contract the suit on the wearer.

Frictionless cable pulleys are alternately journalled on the opposite sides or edges 6 and 7 of the seams 2a, 3a and 4a, as seen more particularly in FIGS. 3 and 4, and nonstretchable flexible pull cables, indicated generally at 2b, 3b and 4b in the drawings, are passed or laced back and forth in zig-zag fashion around the individual frictionless pulleys 8 in the upper and lower portions of the arms, legs and body portions of the suit 1, in the manner shown in detail in FIGS. 3 and 4.

Figure 1:
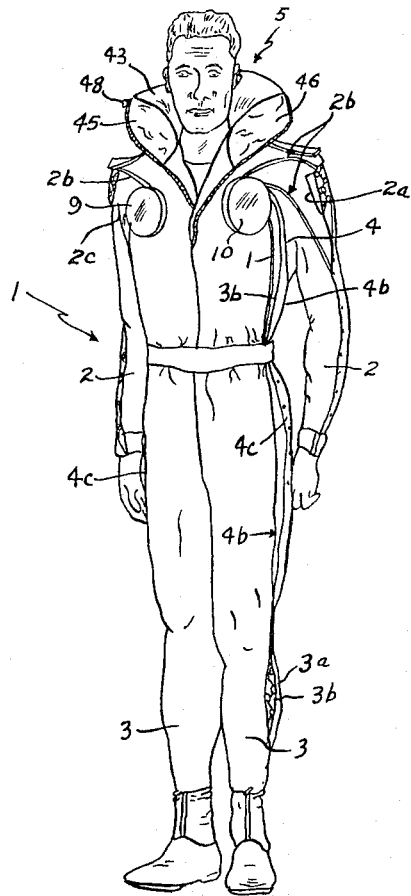
FIG. 1 is an elevation or front view of an astronaut's mechanical pressure suit and folded pop-up helmet, incorporating the invention, showing the helmet folded down or open with the tensioning cables for contracting the suit relaxed.

The lower ends of the cables 2b, 3b and 4b are dead ended and fastened just below the lower portions or seam sections of the suit that are to be contracted. Adjacent the upper pulleys of each set the pull cables are selectively connected to Bowden wire tensioning cables, indicated at 2c, 3c and 4c, which lead to mechanical or spring tensioning units 9 and 10 which are suitably fastened to the exterior of the suit, for instance at 11 as shown in FIGS. 1 and 6.

The cable tensioning units 9 and 10 as shown each comprise a circular supporting body or casing 12 which includes a central sleeve bearing 13 in which a shaft 14 is journalled, the shaft 14 having a cable drum 15 fixed thereon or integral therewith on which the actuating or pulling cables 16 for the Bowden wire tensioning cables 2c, 3c and 4c are dead ended.

Figure 6:
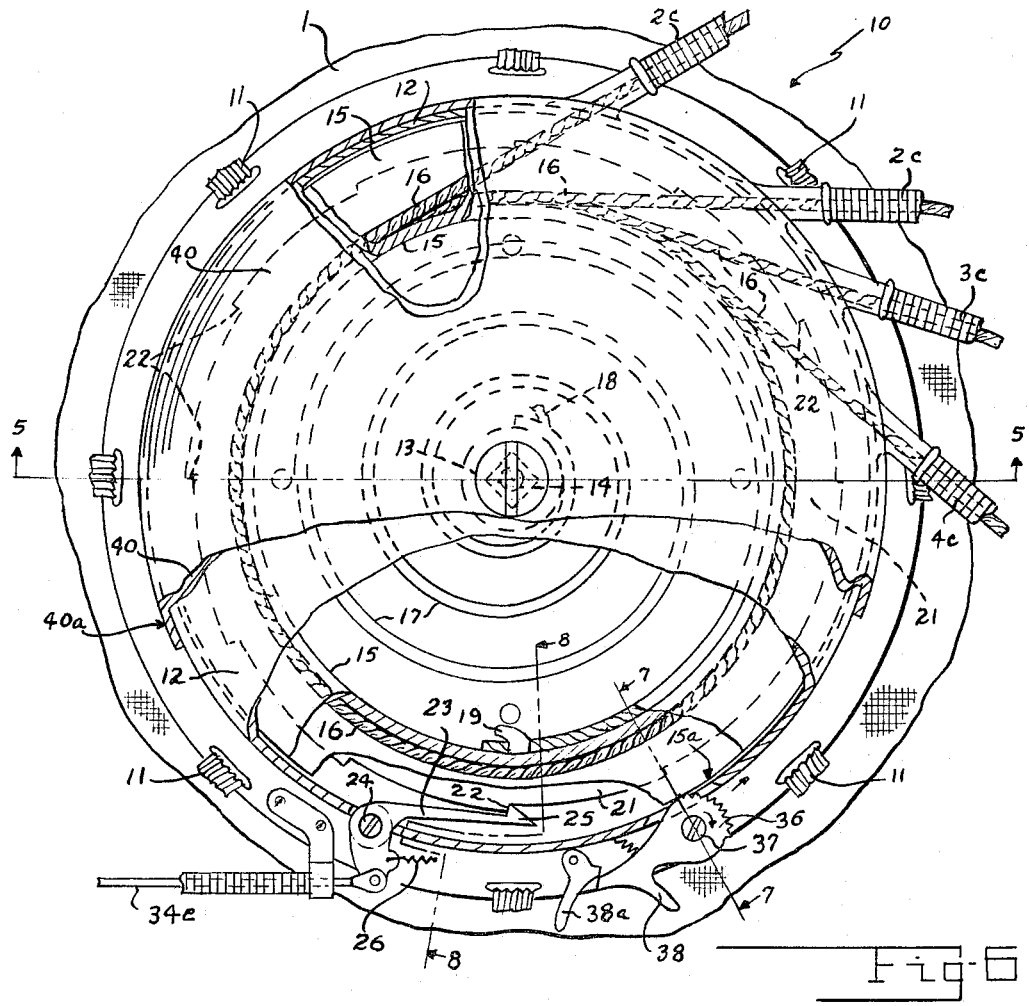
FIG. 6 is a plan view of one of the mechanical cable tensioning units. The internal parts being successively broken away and shown in section, with the suit tensioning cables shown in normal released or untensioned condition.
Figure 5:
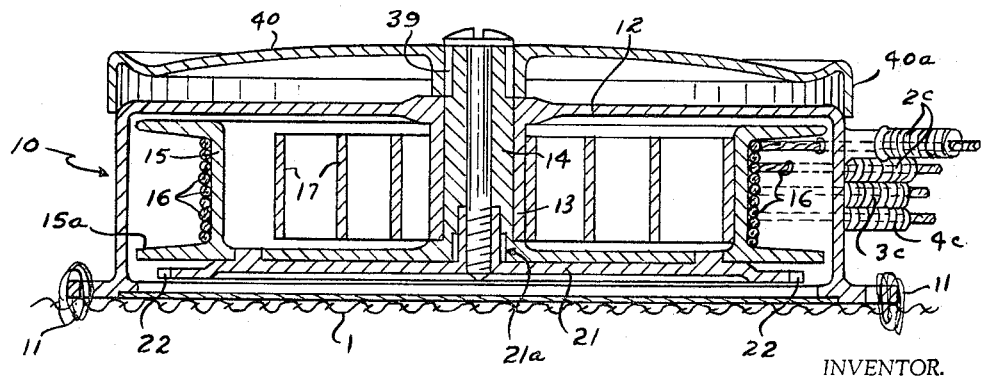
FIG. 5 is a cross-sectional view of one form of mechanical tensioning means that may be employed to pull the tensioning cables for simultaneously tensioning or contracting the arms, legs, and body portions of the suit about the arms, legs and body portion of the wearer, showing a portion of the suit on which it is mounted, as seen in FIGS. 1 and 2.

A spiral winding or tensioning spring for rotating the drums 15, as shown in FIGS. 5 and 6, is indicated at 17, being dead ended at 18 at its inner end on the projecting sleeve bearing portion 13 of the housing 10, while the outer end of the spring is fixed at 19 to the inner surface of the cable drum 15.

It will be seen that when the spring 17 is tensioned the cable drum 15, when released, will rotate or wind up the cables 16, and thus pull the tensioning cables 2a, 3a and 4a on the arms, legs and body of the wearer (as seen in FIGS. 1 to 4). However, means are provided for holding or retaining the cable drums 15 with their springs 17 wound up or under a tensioned condition in which event the cables 16 are in a slack or nontensioned condition, together with means responsive to a predetermined reduction in ambient pressure exteriorly of the suit 1 for releasing the holding means to permit the tensioning means or springs 17 to rotate the cable drums 15 and pull or wind up the cables 16, thus tensioning or contracting the arm, leg and body portions of the suit on a wearer, for instance upon a decompression of pressure in a high altitude, or in a space vessel exteriorly of the suit.

An example of a structure that could be employed for this purpose is shown in FIGS. 5 to 9.

It should be noted that the pressure reduction responsive mechanical tensioning means 9 and 10 must be made of right and left units since the unit 9 tensions the arm, leg and body portions on the right hand side of the suit 1 through the Bowden wire cables 2c, 3c and 4c, while the other unit 10, as shown in FIGS. 5 to 8, controls or tensions the cables for the frictionless pulleys on the longitudinal seams on the left hand side of the suit 1.

Also the suit 1 may be provided suitable closure flap members 20 (with snap fasteners) to cover the seams, pulleys and cables and thus present a neat tailored outside appearance and prevent foreign objects or obstructions from entering between the cables and pulleys, and remove the possibility of jamming the cables and thus preventing the proper tensioning of the suit about the limbs and body of the wearer when found necessary.

In order to normally retain the cable drums 15 in their pretensioned positions ready to apply the pulling tension on the cables 16 to mechanically pressurize the suit 1, the cable drums each carry a ratchet like disk 21, splined at 21a, at its center to the cable drum shaft 14, the disk 21 being disposed at the bottom of the casing 1, as shown, and having ratchet like teeth 22 around its periphery for engagement with a releasable holding means 23, such as a latch lever or pawl which is centrally pivoted at 24 and having a latch end 25 and spring pressed at 26 into normal holding engagement with the teeth or notches 22 of the drum holding disk 21.

Withdrawing of the latch or pawl ends 25 of the latches 23, of course, frees the disks 21 and their connected cable tensioning drums 15. This permits the spiral tension springs 17 to rotate the drums, for instance, the drum 15 as shown, in a counterclockwise direction (and the cable drum 15 in the unit 9 in a counterclockwise direction), thus winding and pulling the cables 16 and connected cables 2b, 3b and 4b to thus mechanically tension the arms, legs and body portions of the suit around the arms, legs and body portions of the wearer to a predetermined extent in the desired manner, (somewhat as contemplated by the conventional capstan suit, when the capstans are inflated).

However, being completely mechanical in its operation, there is no requirement for the use of valuable oxygen or other pressure medium for this purpose when used in space vehicles, eliminating the possibility of leakage and waste of the valuable oxygen into the surrounding environment. Also being self-contained, it does not require a pressure supply or connecting hose and is always ready, only requiring a small walk around oxygen pressure supply for erecting the helmet 5 and releasing the cable drums 15 simultaneously under the control of an aneroid pressure release device and pressure regulator as shown in FIG. 8 and in detail in U.S. Patent 2,697,538.

Figure 8:
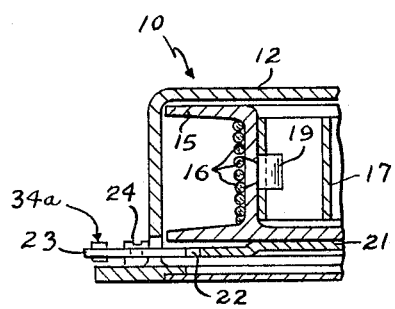
FIG. 8 is a similar fragmentary sectional view taken about on line 8–8 of FIG. 6, showing more clearly the cable drum holding latch or drum release pawl for releasably holding the cable drum in its fully tensioned position to maintain the suit in its uncontracted or nonpressurized condition.

The pressure responsive release means includes a partially evacuated bellows which will expand sufficiently upon a predetermined reduction in outside pressure to release a plunger (as seen in the patent referred to), having a punch which is projected to pierce a diaphragm in the aneroid release device 28, permitting flow of a pressure fluid such as oxygen from a walk around oxygen bottle 29 through a pressure regulator 30, reducing the high pressure in the bottle 29 to a substantially low pressure of around 5 p.s.i. into the flexible conduits 31 and 32 leading respectively to the helmet erection or closing means (shown in FIG. 2), and leading to the release means for the cable drums 15, as shown in FIG. 8 and indicated at 33.

It will be understood that upon a predetermined drop in pressure, the device 28 will admit pressure into the diaphragm release device 34 and depress the diaphragm 34a. This rocks the latch 34b to release the spring biased pull rod 34c to which the two latch release Bowden wire cables 34d and 34e are connected at 34f, the opposite ends of the two cables 34d and 34e being connected respectively to the latches 23 in the housings 9 and 10.

It will thus be seen that upon a predetermined drop or decompression of the air surrounding the device 28, suitably carried on the suit 1, the withdrawal of the latches 23 from engagement with the notches or teeth 22 of the wheel 21 takes place and frees the cable drums 15 simultaneously for rotation by their springs 17 to wind in and tension the cables 16 to mechanically compress or confine the arm, leg, and body portions of the suit around the arms, legs and body of the wearer. The degree of tension will, of course, depend upon the tension of the spiral springs 17, while the period of release of the latches 23 depends upon the degree of evacuation of the aneroid bellows in the device 28, it being desirable to provide an adjustable aneroid or bellows device which will release the cable drums at about 5 p.s.i. or slightly less, since it is permissible to lower the pressure in a space vessel (with oxygen) and still maintain a life sustaining environment at 5 p.s.i. However, upon further exterior pressure reduction or decompression, the bellows or aneroid in the control device 28 should cause the release of the cable winding drums 15 and thus mechanically pressurize the suit on the wearer and simultaneously erect or close the helmet around the head of the wearer and supply oxygen thereinto.

It may be desirable to set the release means for releasing the cable drums 15 to operate at a higher initial pressure and thus mechanically pressurize the suit on the wearer before the final decompression or pressure reduction occurs so that when the final decompression occurs the legs, arms, and body portions of the suit would have been previously compressed or contracted to the desired extent.

Means may be provided to automatically (but releasably) hold the drums 15 against reverse rotation after the drums have been rotated by the spring means 17, thus holding the legs, arms and body of the suit in the mechanically contracted relation until released.

Figure 7:
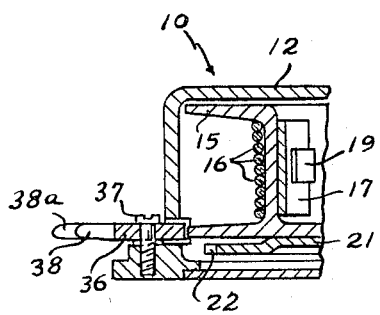
FIG. 7 is a fragmentary sectional view taken about on line 7–7 of FIG. 6, showing the cable drum with the holding cam which may be employed, but omitting the manual resetting wheel or disk.

This releasable holding means, as seen in FIGS. 6 and 7, can take the form of a cam 36 pivoted at 37 and spring rotated into holding engagement with the periphery of the lower flange 15a of the cable drum 15, permitting rotation of the drum in the "wind up" direction but preventing unwinding rotation. These cams 36 can be released by the handles or levers 38 or can be locked in release positions by the cam latch members 38a.

Suitable means may also be provided for rotating the cable drums for retensioning the spring means 17 or, in other words, to reset the mechanical tensioning units 9 and 10 so as to "slack off" the cables 16 and relieve the contracting pressure on the suit.

As seen in FIGS. 5 and 6, the cable drum shaft 14 extends outwardly through the center of the casing 12 and has splined thereon at 39 a hand wheel or disk 40 somewhat in the form of a cover or plate having an outer flange or rim 40a which the wearer may grasp and thus rotate the cable drum to unwind the cables 16 and relieve tension on the legs, arms, and body and thus reset the tensioning device (in the event that the latch 23 has returned to its latching position), or the disk 40 can be rotated by the wearer (counterclockwise in FIG. 6), after the latch 23 has been withdrawn, to increase the mechanical contracting tension on the arms, legs and body of the wearer.

Figure 10:
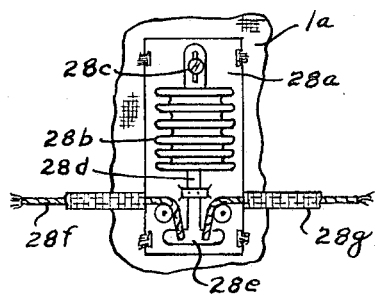
FIG. 10 is also a fragmentary detailed view of a simple aneroid or bellows device which may be employed to pull the Bowden wire release cables upon a predetermined drop in the surrounding or outside pressure for releasing the cable drum units simultaneously to tension or contract the partial pressure suit on the body of the wearer.

Reference is made to FIG. 10 which shows a simple aneroid bellows device which may also be employed to simultaneously release both cable drums 9 and 10. This arrangement comprises a supporting plate 28a which is carried on the suit 1a between the two tensioning units 9 and 10 (not shown in this figure of the drawing). The plate 28a adjustably carries an aneroid metal bellows 28b adjustable at 28c, having an extensible end and push rod 28d carrying a cross head 28e to which the ends of pull cables (of the Bowden wire type), indicated at 28f and 28g are connected. The other ends of these cables, like the cables 34d and 34e, are connected to the release latches 23 (not shown in this figure).

Expansion of the partially evacuated bellows 28b, due to a predetermined reduction in the surrounding exterior atmospheric pressure pulls the cables 28f and 28g to release the latches 23 and thus mechanically tension the suit on the wearer.

Since the limbs of the wearer of the suit are ordinarily not round in cross section, or are formed with slight hollows in places, it may be desirable when the suit is tensioned to equalize the confining pressure of the suit on the surface of the wearer, particularly with respect to the arm and leg portions of the suit.

Gas or air filled pads may be fitted and secured to the interior of the suit to fit these irregular, nonround portions and fill out the interior of the portions of the suit surrounding these portions of the body.

As seen schematically in FIGS. 11 and 12 and indicated at 41 are shown the pads just referred to. These pads may be formed of altitude actuated expansion porous material, such as form fitting units made of gas filled sponge rubber or inserted gas filled bladders, fitting loose but snug under normal pressure conditions as shown in FIG. 12, but upon the reduction of exterior pressure the bladders or gas cells expand, as seen in FIG. 11, to thus equalize the confining pressure of the suit on the surface of the body of the wearer, for instance the limbs as depicted in FIGS. 11 and 12.

Referring again to FIGS. 1 and 2, the helmet 5 is formed of flexible air impervious material, like plastic, and is divided so as to fold back off the head and onto the shoulders, as seen in FIG. 1.

Figure 2:
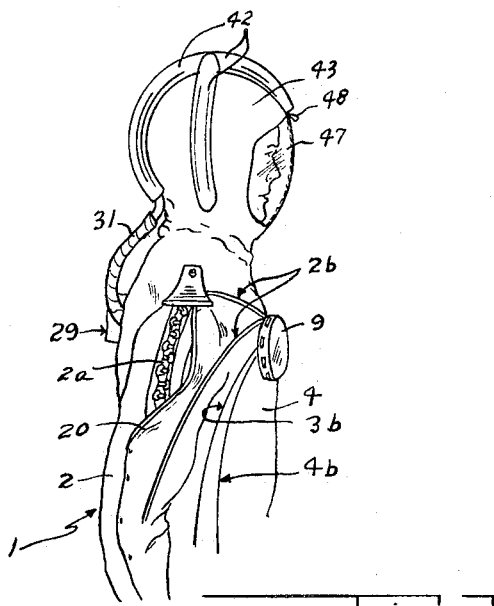
FIG. 2 is a side view of the upper portion of the suit shown in FIG. 1, illustrating the suit in mechanically contracted or tensioned relation about the body or upper limbs of the wearer, and with the helmet erected and closed.
Figure 9:
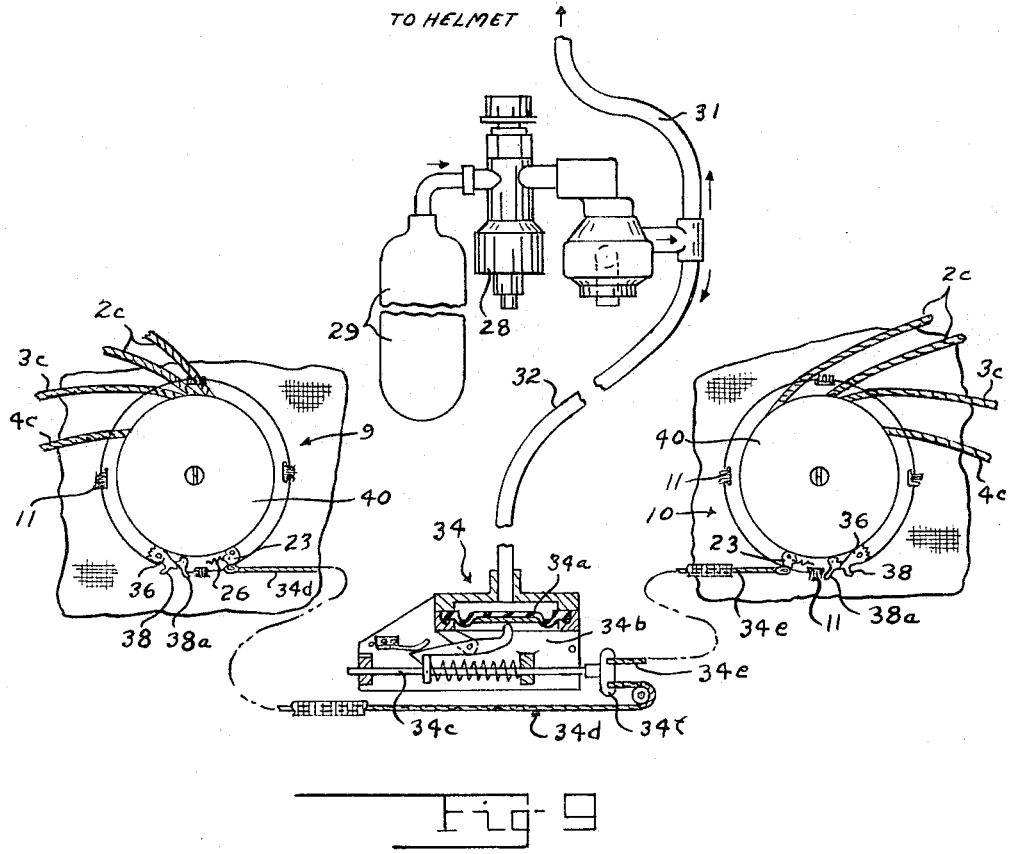
FIG. 9 is a fragmentary schematic view showing the use of an aneroid pressure release and pressure regulator, such as shown in detail in U.S. Patent 2,697,538, for controlling the automatic release of the mechanical pressurizing or cable pulling drums and the simultaneous application of pressure for erection of the pop-up helmet.

The exterior of the helmet on both sides and the back is formed with a plurality of air or gas inflation and erection tubes 42 and 42a connected to a suitable common source of air or oxygen under the control of an automatic pressure release valve such as shown in FIG. 9, so that when the aneroid pressure responsive device therein functions due to decompression pressure oxygen is supplied through the conduit 31 into the inflatable tubes 42 and 42a to snap the right and left sections 43 and 44 of the helmet upwardly from the folded position shown in FIG. 1 to the erected and closed position shown in FIG. 2.

The forward portions 45 and 46 of the helmet are formed of transparent material and may be provided with suitable pressure sealing means at their mating edges, for instance such as a gas sealing types zipper or other means 48.

A suitable gas seal of any conventional construction may be provided to prevent oxygen from passing out of the neck of the helmet.

The interior of the helmet may be suitably supplied with oxygen from the conduit 31 by a pressure relief valve which supplies oxygen into the helmet when the helmet is erected by the inflation of the tubes 42 and 42a, the helmet, of course, having the conventional exhalation valve for relieving excess pressure and the wearer's exhalation from the interior of the helmet.

It should be noted that since the folding helmet 5 requires compressed oxygen for sudden erection (pop-up) at a predetermined altitude and internal oxygen pressure up to 5 p.s.i., it may be desirable to use the same walk around small oxygen cylinder with a mounted altitude controlled oxygen release mechanism and valve as shown in my U.S. Patent 2,697,538 referred to or equal for simultaneously erecting and inflating the helmet with pressure and actuating the left and right side lever release means for the cable tensioning drums by employing a small oxygen pressure actuated diaphragm in place of the aneroid. The oxygen pressure leading through small hoses from the oxygen cylinder to the spring housings with pressure diaphragms connected to the release latches to move the latches to release positions.

I claim:

1. An improved mechanical partial pressure suit comprising flexible arm, leg, body and head enclosure portions for receiving the arms, legs, body and head of a wearer, frictionless lacings extending longitudinally along the sides of said arm, leg, and body portions of said suit for contracting the suit about the wearer thereof when said lacings are pulled, releasable tensioned spring means carried by said suit and connected to said lacings for pulling said lacings to tension said arm, leg, and body portions on the wearer when said tensioned spring means is released, and ambient pressure reduction responsive means carried by said suit for releasing said releasable tensioned spring means upon a predetermined reduction in ambient pressure exteriorly of said suit.

2. An improved form fitting porous fabric partial pressure suit comprising contractable arm, leg and body enclosure portions for receiving the arms, legs, and body portion of a wearer, frictionless lacings extending longitudinally along the sides of the arm, leg and body portions of the suit for contracting the same about the arms, legs and body of a wearer to provide a mechanical partial pressure suit when said lacings are pulled, releasable tensioning means carried by said suit and connected to said lacings for simultaneously pulling said lacings when said tensioning means is released, and means carried by said suit, responsive to a predetermined decompression of the air exteriorly of said suit for releasing said tensioning means for pulling said lacings to contract the legs, arms and body portions of said suit on the arms, legs and body of the wearer.

3. An improved form fitting mechanical partial pressure suit comprising arm, leg and body enclosure portions formed of flexible nonstretchable porous fabric adapted to comfortably fit and enclose the arms, legs and body of a wearer, frictionless lacings extending longitudinally in the sides of said arm, leg and body portions of said suit for contracting said portions on the arms, legs and body of a wearer when the lacings are tightened, mechanical tensioning means carried by said suit and connected to said lacing for tensioning the same to contract said arm, leg and body enclosure portions, and ambient air pressure reduction responsive means for causing operation of said mechanical tensioning means upon predetermined reduction of ambient air pressure exteriorly of said suit.

4. A mechanical partial pressure suit comprising form fitting contractible seam extending longitudinally on the side thereof, frictionless pulley rollers alternately journalled along the opposite sides of the seams, flexible nonstretchable pull cables laced alternately back and forth around said pulley rollers in a direction generally upward from the lower extremities of said suit with said cables dead ended at the lower ends of said seams, spring tensioned cable winding drums carried by the upper portion of the body portion of said suit having said cables wound around and dead ended on said drums, ambient pressure reduction operated release means carried by said suit responsive to a predetermined reduction in ambient pressure exteriorly of said suit for releasing said spring tensioned cable winding drums for automatically tensioning said cables and pulling the same for contracting said leg, arm and body portions of said suit on the legs, arms and body of a wearer of said suit upon said predetermined reduction of ambient pressure exteriorly of said suit.

5. A partial pressure suit for astronauts comprising a porous nonstretchable body having flexible porous nonstretchable arm and leg portions adapted to receive and enclose the body, arms and legs of a wearer, said body, leg and arm portions of said suit having longitudinally extending laterally expandable seams, closely spaced frictionless cable rollers journalled in alternately spaced relation on said arm, leg and body portions of said suit along the opposite edges of said expandable seams, tensioning cable means dead ended at the lower ends of said seams and laced alternately back and forth around said cable rollers to points upwardly from said seams, whereby tensioning of said cable means draws the opposite edges of said seams toward each other to tighten said arm, leg and body portions on the arms, legs and body of a wearer within said suit, a plurality of cable tensioning means connected to the upper ends of said cable means, means carried by said suit and responsive to a predetermined reduction in ambient pressure exteriorly of said suit for actuating said cable tensioning means, releasable means engagable with said cable tensioning means preventing said cable and tensioning means from loosening said cable means after the same has tensioned said cable means.

6. A mechanical partial pressure suit and collapsed mechanically erectable helmet, comprising a nonstretchable body having nonstretchable arm and leg portions and an erectable flexible helmet folded down around the neck of the suit to receive the body, legs, arms and head of a wearer, said suit having a plurality of frictionless cable pulleys alternately laterally spaced in a longitudinal direction along the sides of said arm, leg and body portions of said suit, cable tension members dead ended below said pulleys and laced back and forth around said pulley beyond the upper pulleys, spring tensioned cable winding drums carried by the upper front portion of said suit, Bowden wire cable tensioning means connected to said cable tensioning member and said drums for tensioning said cable tensioning members for contracting the leg, arm, and body portions of said suit on the wearer, release means carried by said suit in holding engagement with said drums, means responsive to a predetermined reduction in surrounding air pressure exteriorly of said suit for disengaging said releasable holding means from said drums to permit the same to wind said cable means on said drum, and releasable means movable to engage said drum for holding said drum to maintain cable means tensioned until released, and means operable by said release means substantially simultaneously with the release operation thereof for causing erection of said helmet about the head of the wearer.

7. Apparatus as set forth in claim 6 in which said flexible helmet includes pneumatic means for erecting the same around the head of the wearer and means for supplying pneumatic pressure to the pneumatic means and valve means including a source of oxygen pressure in which said valve means is actuated, said pressure reduction responsive means for erecting said helmet, including means for supplying oxygen into the erected helmet at a predetermined pressure for use by the wearer.

References Cited by the Examiner

UNITED STATES PATENTS

| | | |
|---|---|---|
| 2,871,849 | 2/1959 | Chatham et al. |
| 2,886,027 | 5/1959 | Henry _____ 2—2.1 X |
| 2,967,305 | 1/1961 | White et al. _____ 2—2.1 |
| 3,000,010 | 9/1961 | Rich _____ 2—2.1 |
| 3,099,261 | 7/1963 | Doss et al. _____ 128—1.01 |

FOREIGN PATENTS 861,015  2/1961  Great Britain.

JORDAN FRANKLIN, *Primary Examiner.*

J. R. BOLER, *Assistant Examiner.*